(12) United States Patent
Peterson

(10) Patent No.: US 8,920,083 B2
(45) Date of Patent: Dec. 30, 2014

(54) RAIL AND TRUCK TOWER TRANSPORT SYSTEM

(75) Inventor: Eric M. Peterson, Boston, MA (US)

(73) Assignee: Siemens Aktiengesellschaft, München (DE)

( * ) Notice: Subject to any disclaimer, the term of this patent is extended or adjusted under 35 U.S.C. 154(b) by 111 days.

(21) Appl. No.: 13/412,660

(22) Filed: Mar. 6, 2012

(65) Prior Publication Data
US 2013/0236263 A1    Sep. 12, 2013

(51) Int. Cl.
*B60P 7/08*    (2006.01)

(52) U.S. Cl.
USPC .................................. 410/45; 410/44; 410/91

(58) Field of Classification Search
USPC ........ 410/44, 45, 53, 76, 89, 90, 91; 280/404; 105/355
See application file for complete search history.

(56) References Cited

U.S. PATENT DOCUMENTS

| | | | |
|---|---|---|---|
| 1,772,939 A * | 8/1930 | Fitch | ............................. 410/91 |
| 3,841,275 A | 10/1974 | Bisbee et al. | |
| 4,041,879 A | 8/1977 | Cockrell | |
| 4,083,311 A | 4/1978 | Wivagg | |
| 4,160,420 A | 7/1979 | Hackbarth et al. | |
| 6,286,435 B1 | 9/2001 | Kassab et al. | |
| 7,690,875 B2 * | 4/2010 | Grabau | ........................... 410/45 |
| 2008/0232920 A1 | 9/2008 | Wobben | |

* cited by examiner

*Primary Examiner* — Stephen Gordon

(57) ABSTRACT

The presented embodiments provide a system (10) for transporting a load (12) via multiple conveyance types. The system (10) includes a supporting member (22, 23) configured for attachment to the load (12), including a vehicle interface portion (40, 42), a first supporting member interface portion for attachment to the first vehicle of a first conveyance type, and a second supporting member interface portion for attachment to the second vehicle of a second conveyance type. The vehicle interface portion and the first and second supporting member interface portions are cooperatively configured such that when the load (12) is attached to the supporting member (22, 23) it can be moved between the first and second vehicles by a vertical lift and place move selectively parting and joining the vehicle interface portion with the first and second supporting member interface portions without the necessity of joining or separating a fastener.

17 Claims, 6 Drawing Sheets

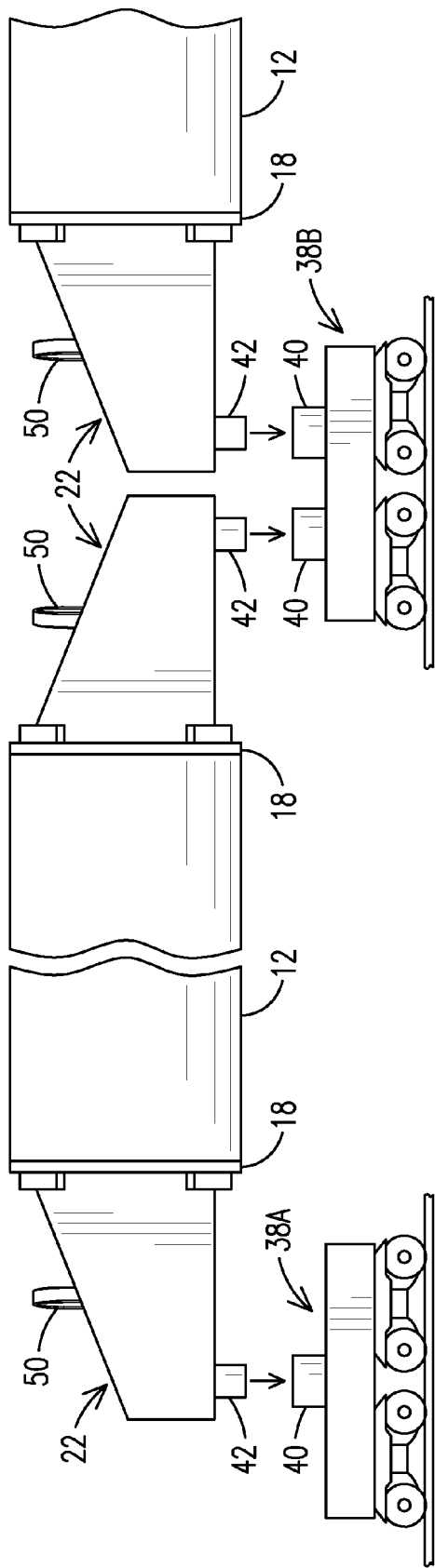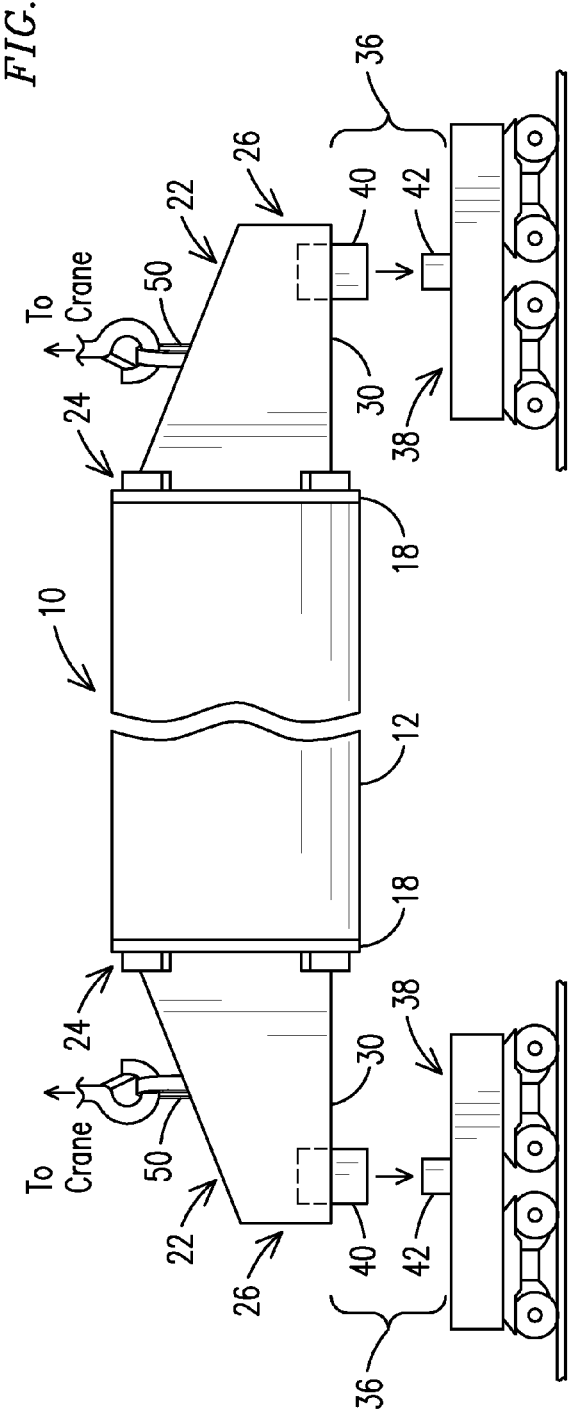

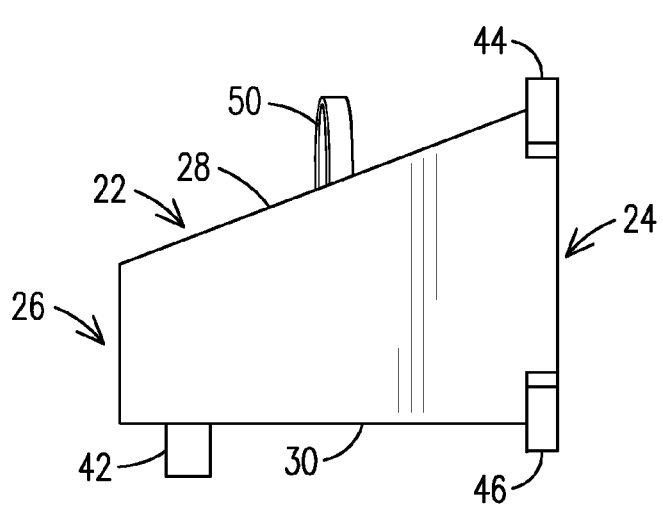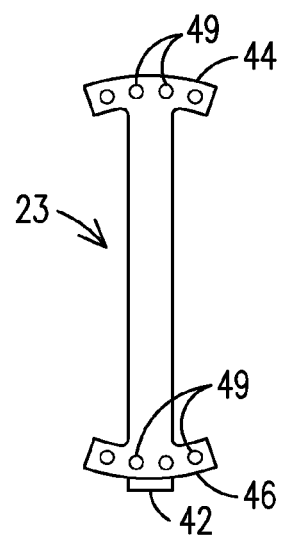
*FIG. 5*  *FIG. 6*
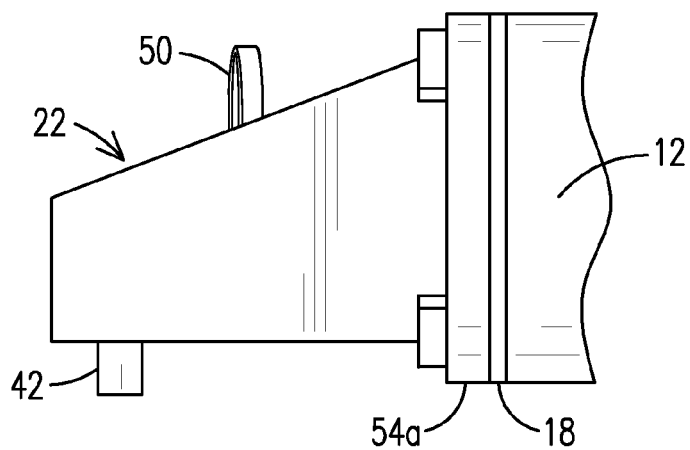
*FIG. 7*
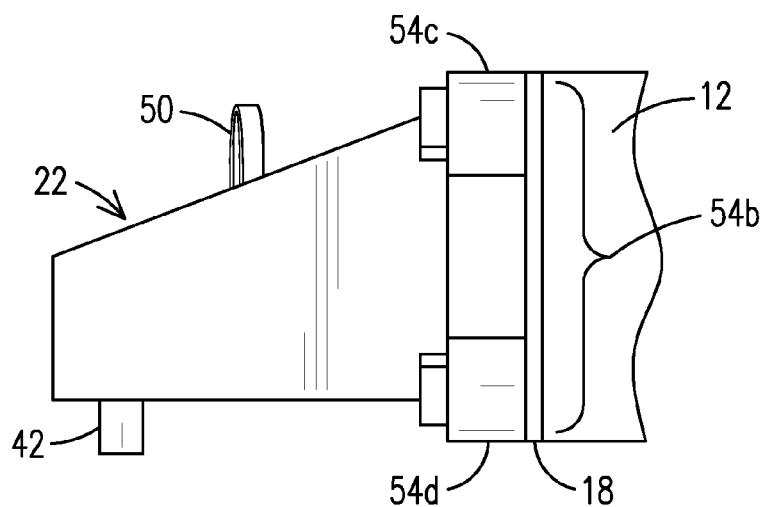
*FIG. 8*

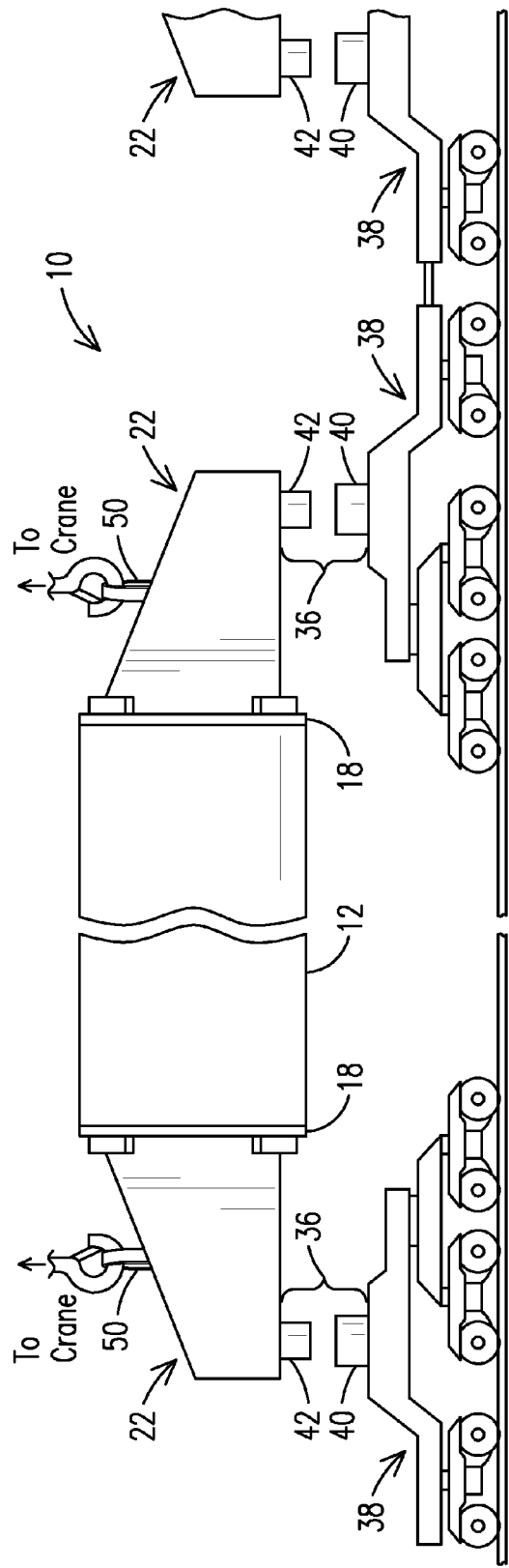
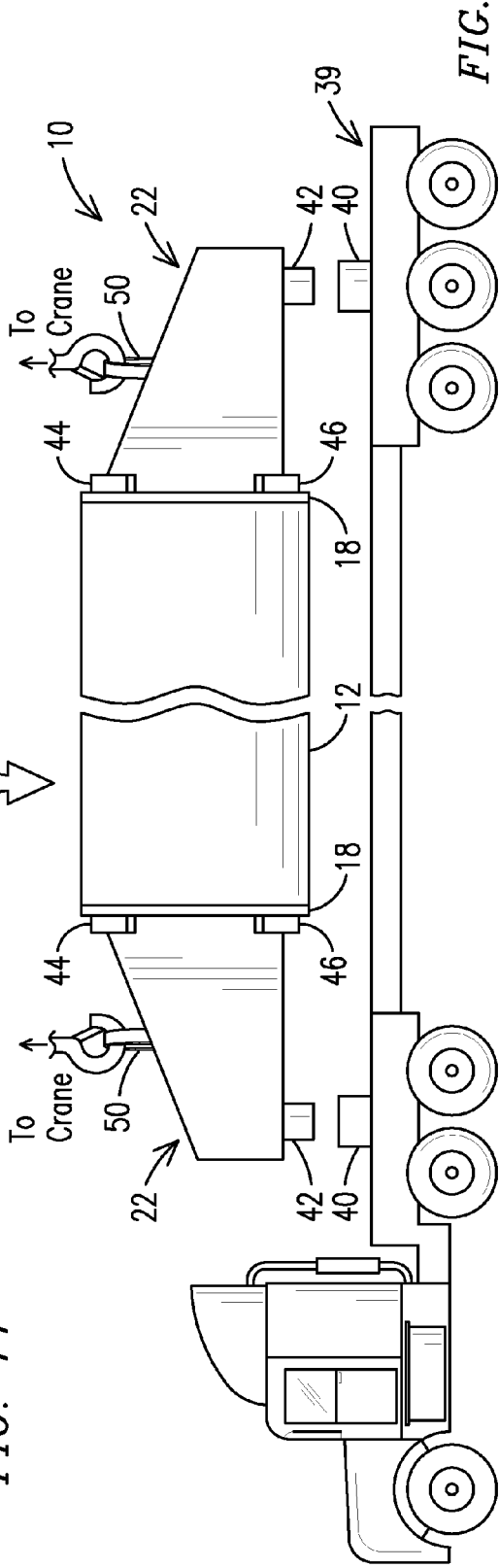

RAIL AND TRUCK TOWER TRANSPORT SYSTEM

FIELD OF THE INVENTION

This invention relates in general to a transportation system, and more particularly, to a transportation system for transporting large loads, such as wind turbine towers, along a transportation route, and for transferring the load between railcars and truck beds along the route.

BACKGROUND OF THE INVENTION

Transporting large, heavy loads from one location to another, usually with stops or vehicle transfers along the route, can be a difficult task. Oftentimes these loads are affixed on each end to an arm by bolts or other connecting devices. The arm is then affixed to a mobile device for moving the load from an initial point to a second point.

Once the load reaches the second point for loading aboard a different mobile device or any conveyance type, the bolt connections which connect the arms to the load must be removed and replaced by a different arm that suitably mates with the new mobile device. This occurs when a load must be transported along at least part of its journey by one mobile device (e.g., a rail car), and another part of its journey by a different mobile device (e.g., a truck bed). The available methods and techniques require connecting the arms to the load, transporting the load using a first mobile device, disconnecting the arms from the load prior to transferring to a second mobile device, reconnecting differently-configured arms for use with the second mobile device, and transporting the load using the second mobile device.

Schnabel cars are currently used in order to transport large loads from one location to another. A Schnabel car is a specialized type of railroad freight car or truck trailer, which is designed to carry heavy and oversized loads in such a way that the load itself forms a part of the car or trailer. The load is suspended between two wheeled vehicles by lifting arms attached to the wheeled vehicles. The lifting arms are connected to the wheeled vehicles by a pivot above an assembly of pivots and frames that carry the weight of the load and allow lateral and vertical adjustment of the load during transport.

When a Schnabel car or trailer is empty, the two wheeled vehicles are connected together and the car can usually operate at normal freight train or truck speeds. Some Schnabel cars include hydraulic equipment that lifts or horizontally shifts the load while in transit to clear obstructions along the car's route. However, Schnabel cars do not easily provide for the transfer of large loads from the Schnabel car to a truck bed, or from the Schnabel car to a Schnabel truck trailer, or for the transport of a load on a conventional rail car for a portion of the distance and then transfer to a truck bed or Schnabel trailer for the remainder of the distance. These load transfers between the various conveyance types require multiple steps (bolting/unbolting) at each transfer point.

BRIEF DESCRIPTION OF THE DRAWINGS

The invention is explained in the following description in view of the drawings that show:

FIG. 3 is a partial side view of two loads being transported on receiving devices FIG. 4 is a side view of a load with supporting members on each end of the load with a receiver (mating element) located on the bottom side of the supporting members.

FIG. 5 is a side view of a supporting member.

FIG. 6 is an end view of a supporting member viewed from the load end.

FIG. 7 is a side view of a portion of a load with a supporting member attached to one end, including a long intermediate member disposed between the supporting member and the load.

FIG. 8 is a side view of a portion of a load and an alternative version of an intermediate member.

FIGS. 11-12 are side views illustrating successive unloading and reloading steps.

DETAILED DESCRIPTION OF THE INVENTION

Figure 1:
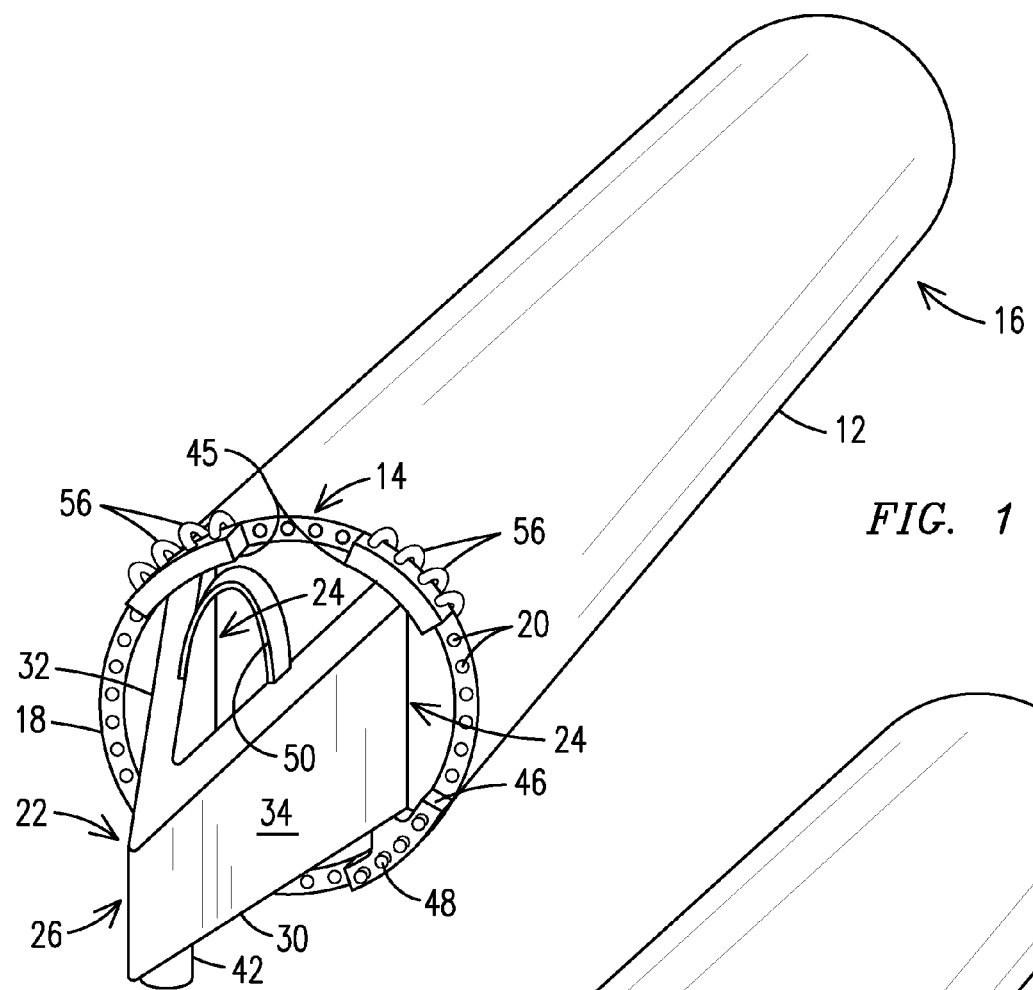
FIG. 1 is a perspective view of a portion of an embodiment of the transportation system, showing a supporting member comprising two arms.

The present inventor has recognized that it would be advantageous to provide a system by which a load can be transferred from a first location to a second location with load transfers at intermediate locations there between, while providing a time and cost-savings to users of the system. The inventor has also recognized a benefit in providing the system in which the load can be transported by both rail and road without the need to disconnect or secure supporting members on each end of the load at intermediate locations between the first location and the second location. Therefore, with a simple lift and place procedure, the load and the attached supporting members can be transferred from a rail vehicle to a road vehicle or road vehicle to rail vehicle with ease, without any need for disconnecting the supporting members from the load until the load has reached its final destination.

For the purposes of promoting an understanding of the principles and operation of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being, contemplated as would normally occur to those skilled in the art to which the invention pertains.

The presented embodiments of the invention provide a system wherein supporting members are attached to a load at a point of origin (first location) and remain attached to the load as it is transported from the first location to intermediate stops until the load reaches its second location (often the final location). This inventive arrangement is made possible by use of a receiver (or mating element) that allows the load and the supporting members to be transferred from rail to truck or from truck to rail with one lift operation and without attaching and detaching or un-bolting and re-bolting any supporting members or fasteners. According to one embodiment, the inventive arrangement takes advantage of a pin/receiver assembly which, when engaged, provides vertical support for the load and allows the supporting members to be rotatably connected to a mobile device for moving the load around curves in a road or rail, while at the same time can be disengaged by simply lifting the load vertically without the need for the removal of any mechanical fastening device.

As used herein, the terms "first portion of a pin/receiver assembly", "vehicle interface portion", and "first mating element" are interchangeable. As used herein, the terms "second portion of a pin/receiver assembly", "second mating element" and "supporting member interface portion" are interchangeable. The mating elements, and the interface portions or elements mate with one another in a rotatable or fixed assembly such as a pin/receiver assembly or the like. Various types of conveyances are contemplated in the disclosure of the invention which include but are not limited to railway transportation, roadway transportation, and waterway transportation.

The terms "pin" and "receiver" and "male element" and "female element", respectively, can be used interchangeably. The terms "interface" and "assembly" can be used interchangeably. The "vehicle interface portion" and "supporting member interface portion" together make up the "pin/receiver assembly" in the embodiments disclosed herein. The term "connected" as used herein, refers to both a direct connection as well as an indirect connection.

The novel invention provides one benefit in particular, that a large and long load can articulate narrow curves along the route of travel. The supporting members are removed from the load once the load arrives at the final destination, whether or not there are multiple transfers of the load between various mobile devices at intermediate locations. The second location as discussed herein refers to the final destination of the load.

Figure 14:
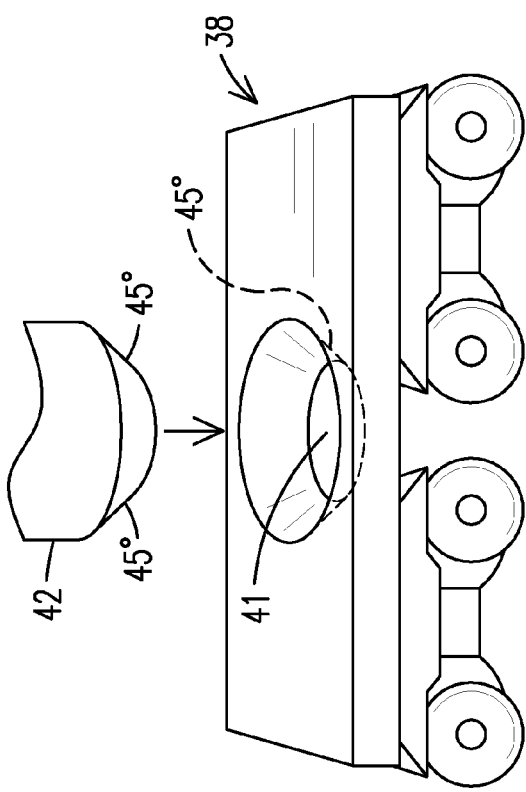
FIG. 14 shows a pin/receiver assembly with a male element including a 45 degree angle circumference around its tip. A complementary 45 degree angle is shown around a hole receiver on a mobile device.

The pin/receiver assembly of the presented embodiments may be in the form of a pin within an opening or a hole, or it may be in the form of a ball and socket connection. The pin/receiver assembly may alternatively be any other type of connection between two parts that provides vertical load support, rotational freedom in a horizontal plane, and disengagement by a vertical lift of the load. In an embodiment, the male element may be conically shaped with an angled head (e.g., 45 degree bevel), with the receiver comprising a complementary angled cavity (e.g., 45 degree bevel) such that the male element can be easily guided into the receiver without requiring a direct vertical alignment between the male element and the receiver before it can be received within the opening. This feature is further described below relative to FIG. 14.

These novel embodiments greatly decrease the transport time for each load, and over time ultimately provide a significant cost savings for transporting equipment and loads, solving many of the problems found in the prior art.

The presented embodiments also provide a vertical height adjustment feature, wherein the load can be vertically raised or lowered with the use of hydraulically powered devices (e.g., cylinders) or by inserting or removing spacers from the connection between the supporting member and the receiver. The term "spacer" or "spacers" as used herein refers to a structure or series of structures that can be vertically stacked on top of one another, and which can be placed within the receiver, such that the supporting member can be placed on top of the spacer(s). The spacers can be formed of any appropriate material that is known in the art.

A significant improvement over the prior art offered by the presented embodiments is the receiver. One side of the receiver is adapted for attachment to a supporting member, which is in turn attached to the load. The other side of the receiver is adapted for removable attachment to any one of multiple different mobile devices, the mobile devices including trucks, rail cars, and other vehicles for transportation. The universality of the receiver provides great benefits to the users of this system. In one embodiment, the receiver remains attached to each of the supporting members on either side of the load from the beginning of the transportation route to the end of the transportation route. The receivers provide the connectability necessary to easily "lift and place" the load from rail to truck back to rail again, in one example, without disconnecting and reconnecting any parts of the system (including the supporting members on either side of the load) between the first and the second locations. A lift and place interface is provided by the presented embodiments to streamline the transportation of the loads from a first location to a second location. The pick or lift and place interface is one in which a load can be lifted ("picked up") by a crane or other mechanism from one mobile device and "placed" onto another mobile device without any additional efforts such as bolting, unbolting, hooking, un-hooking, fasteners and other structural members, etc. This pick and place interface provides a cost-savings to the users of the system as less time and effort is used when the load is moved from one mobile device to another.

Figure 2:
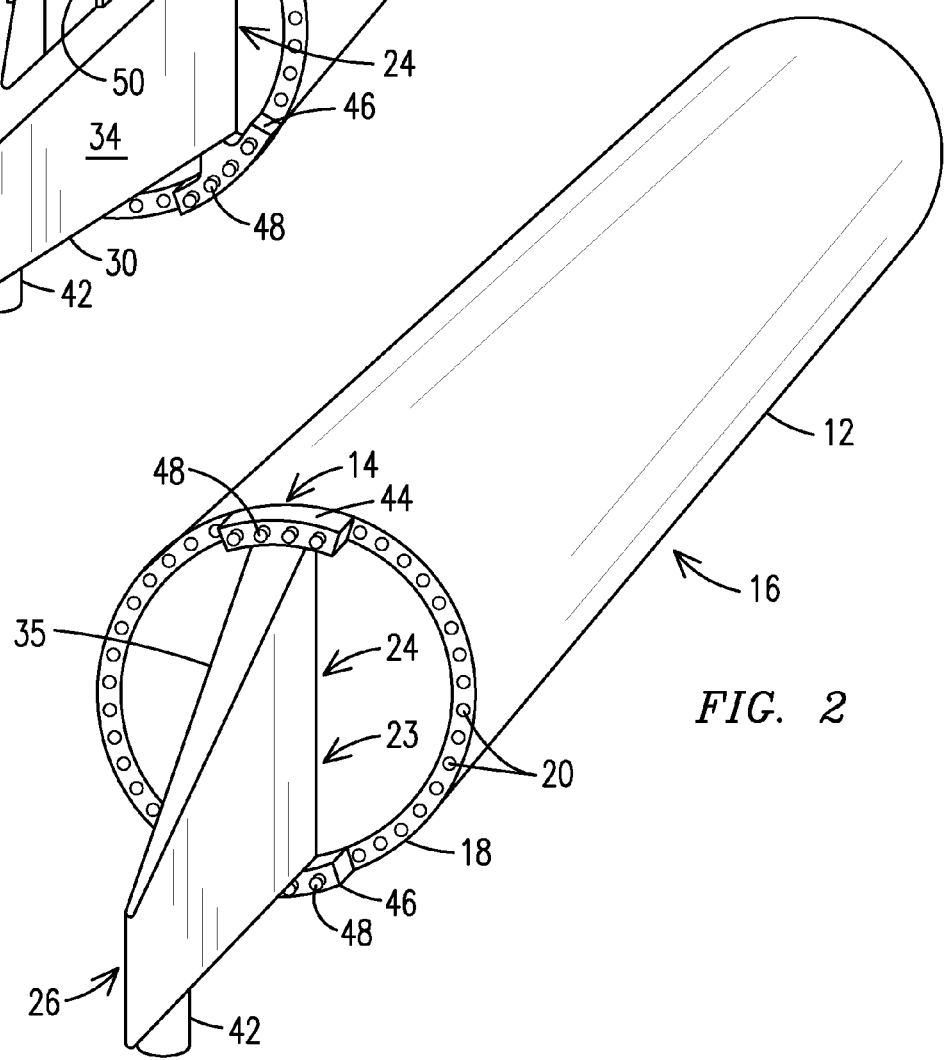
FIG. 2 is a perspective view of a different embodiment of the transportation system, showing a supporting member comprising only one arm.

Turning to the drawings, FIGS. 1 and 2 are views of alternative embodiments of the transportation system from a first end of a load, where only one supporting member 22 or 23 (FIGS. 1 and 2, respectively) is shown. A supporting member on the second end of the load in each figure is omitted. In both FIGS. 1 and 2 the load 12 is depicted with holes 20 in a tower flange 18 on a first end 14 of the load 12. The supporting member 22 (FIG. 1) is attached to the load 12 using bolts 48 and mating nuts passing through the holes 20 in the flange 18 at the end of the load 12 (mating nuts are not illustrated in FIGS. 1 and 2).

In one particular embodiment, at least one intermediate member is attached (not shown in FIG. 1 or 2) to each end of the load 12 via the tower flange 18; the holes 20 are formed in the intermediate member such that the intermediate member holes are aligned with the holes in the tower flange, and the intermediate member is attached to an end of the load 12 by way of the tower flange 18 at the end of the load 12 (see FIGS. 7-8, where this arrangement is described in more detail).

In another embodiment, a circular disk (not shown in FIG. 1 or 2) is attached to either end of the load and the holes are located in the circular disk. The disk can be attached to either end of the load using bolts passing through the holes 20 and mating nuts, or by another similar means known in the art. The circular disk may be used in place of the intermediate member or in addition to the intermediate member.

Other structural members having holes formed therein can be attached to load ends, in some cases via the flanges 18. The supporting member 22 (FIG. 1) or the supporting member 23 (FIG. 2) can be attached to these structural members using any removable attachment devices, such as bolts and nuts, hooks and claws 56 of FIG. 1, or any other attachment device known in the art. Additionally, the first and second attachment structures 45 and 46 (FIG. 1) and the first and second attachment structures 44, 46 (FIG. 2) can be attached via hydraulic components and/or pistons, providing for adjustability to fit different sizes of towers.

In a further embodiment, the bottom portion of the supporting member (i.e., the second attachment structure, 46) is secured to the lower portion of the first or second end of the load 12 via the tower flange 18 by a bolt/nut connection or any other secure connection known in the art. The first attachment structure 44 can be secured to the upper portion of the first or second end of the load 12 through the tower flange 18 via a hook, claw, (see FIG. 1) or other similar structure known in the art.

In a further embodiment, a bumper or other such force-absorbing element known in the art may be placed between the first attachment structure 44 and the tower flange 18 around the top portion of the first or second end of the load 12, wherein the lower portion of the first or second end of the load 12 is secured to the second attachment structure 46 by bolt/nut connections 48 or other means. In this configuration, a substantial portion of the weight of the tower rests on the bottom portion of the supporting member (i.e., second attachment structure 46) such that when a claw or hook is provided between the first attachment structure 45 and the tower flange 18 at the top portion of the first or second end of the load 12 (see FIG. 1), a tension is created between the two structures (between the supporting member and the load). A secured attachment between the top portion of the first or second end of the load 12 and the first attachment structure 44, 45 may not be necessary in all embodiments, as a natural force of this particular arrangement serves to adjoin the first attachment structure 44, 45 and the upper portion of the first or second end of the load 12 via a bumper or other similar element when the second attachment structure 46 is adjoined to the lower portion of the first or second end of the load 12. The bumper as described herein can be formed of rubber or other material known in the art to prevent the metal structures from rubbing against one another.

FIG. 1 shows the supporting member 22 including a first arm 32 and a second arm 34 attached to the first end 14 of the load 12 as illustrated. FIG. 1 also shows a male element 42 extending from the bottom side 30 of the supporting member 22. A structural support element (not shown), such as a pin structure in one embodiment may be located between arms 32 and 34 (apex) by a weld or other form of attachment known in the art to provide additional support to strengthen the joint between the arms 32 and 34. In another embodiment, the male element 42 can be situated at the apex between the first arm 32 and second arm 34 in FIG. 1 so as to provide additional support and form a stronger joint. FIG. 1 also shows the bolts/nuts 48 located on the second attachment structure 46 of the supporting member 22. In FIG. 1, the first attachment structure 44 is shown as attached to the load 12 via hooks and/or claws 56.

The first and second arms 32 and 34 of the supporting member 22 in one embodiment may be as shown in FIG. 1 or may have alternative configurations. The arms may be formed of metal bars or of any other material of sufficient strength known in the art. Other possible configurations and materials for the arms which are not specifically mentioned herein, but which achieve the same purpose as those mentioned herein, are also included within the scope of the presented embodiments.

FIG. 2 illustrates a different embodiment with a supporting member 23 that includes only a single arm 35. FIG. 2 also shows the bolts 48 connecting the first attachment structure 44 and the second attachment structure 46 of the supporting member 23 through the connection holes 20 in the tower flange 18. The male element 42 and the holes 20 are also shown in the first end 14 of the load 12 in FIG. 2.

FIG. 3 is a representation of two loads 12, wherein each end of each load is attached to a supporting member 22 on either side of the load. During transportation of the load 12, each supporting member 22 is received within a vehicle mounting device on one of the mobile devices 38A, 38B. In one embodiment, represented in FIG. 3, a mobile device 38A has a vehicle mounting device including one receiver 40, located in the center of the mobile device 38A. A mobile device 38B is represented as having two receivers, 40 located above the wheeled portions of the mobile device 38B. Each receiver 40 in FIG. 3 is configured to receive the male element 42 from each supporting member 22. This is only one particular embodiment, and is not to be considered limiting of the invention, it is possible that additional various embodiments may be used, and various numbers of receivers 40 may be arranged on mobile devices 38. The lifting members 50 are shown in this figure as loop-like structures.

FIG. 4 shows an alternate embodiment of the system 10, showing the first end 24 and the second end 26 of each supporting member 22, wherein the receiver 40 is located on the bottom side 30 of the second end 26 of each supporting member 22. The male elements 42 of the pin/receiver assembly 36 in this embodiment are located on the mobile devices 38. The lifting members 50 are represented as loop-like structures for receiving a crane hook to lift the load 12. The lifting members, however, are not limited to a loop-like structure, and may also include a hook, a cable, or other structure which could be used in order to lift the load. The lifting members may be formed of a solid material, and may be embodied as a rigid metal, a flaccid or rigid rope material, or any other material known to those having ordinary skill in the art.

FIG. 5 shows a side view of the supporting member 22. The first 24 and second ends 26 are shown; the top side 28 and the bottom side 30 are also shown as well as the first and the second attachment structures 44, 46 of the supporting member 22. The lifting member, 50, is also represented in FIG. 5.

FIG. 6 shows an end view of the first end of the supporting member 23 in FIG. 2, viewed looking out from inside the load. The first 44 and second 46 attachment structures and male element 42 can be seen in this view as well as the supporting member holes 49. Attachment structures 44, 45, and 46 (in both FIGS. 1 and 2) are soldered or welded onto the supporting member 23 in this configuration.

FIG. 7 illustrates one possible embodiment of an intermediate member 54a located between the supporting member 22 and the load 12 via the tower flange 18. In FIG. 7, an intermediate member 54a (comprising a bar in one embodiment) is disposed between the supporting member 22 and the load 12. The intermediate member may be used in cases where the supporting member cannot attach directly to the end of the load, for example, in the case where an intermediate member separates the load 12 from the supporting member 22 (or the supporting member 23 of FIG. 2). At times it may be beneficial to provide an intermediate member 54a between the supporting member and the load, for example, in the form of a type of padding device 54c, 54d such as for example, a bearing pad to provide cushion between the two metal structures (supporting member and load).

FIG. 8 illustrates a side view of another embodiment of an intermediate member 54b located between the supporting member 22 and the load 12. The intermediate member 54b includes two separate spaced-apart members 54c and 54d disposed between the load 12 and the supporting member 22. One intermediate piece 54c is located near a top region of the supporting member 22, and another intermediate piece 54d is located near a bottom region of the supporting member 22.

Between the metal surfaces in the embodiments discussed herein, and particularly between the male element 42 and the receiver 40, bearings (i.e., roller bearings) or heavy-duty grease may be used to prevent wear and reduce the friction between the moving parts.

Figure 9:
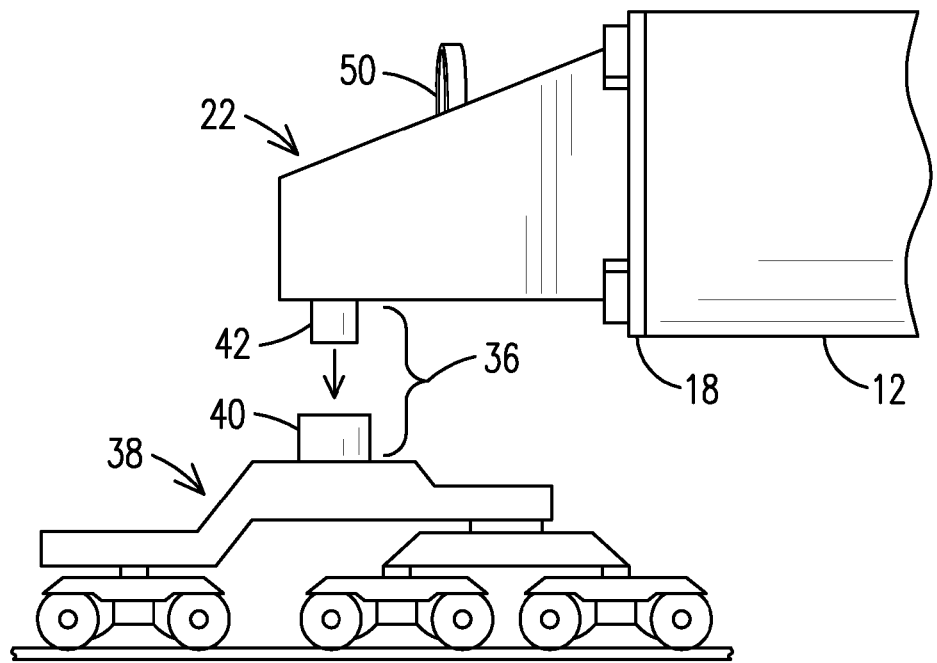
FIG. 9 shows a side view of a portion of the transportation system, where the universal adaptor receiver is located on the receiving device.
Figure 10:
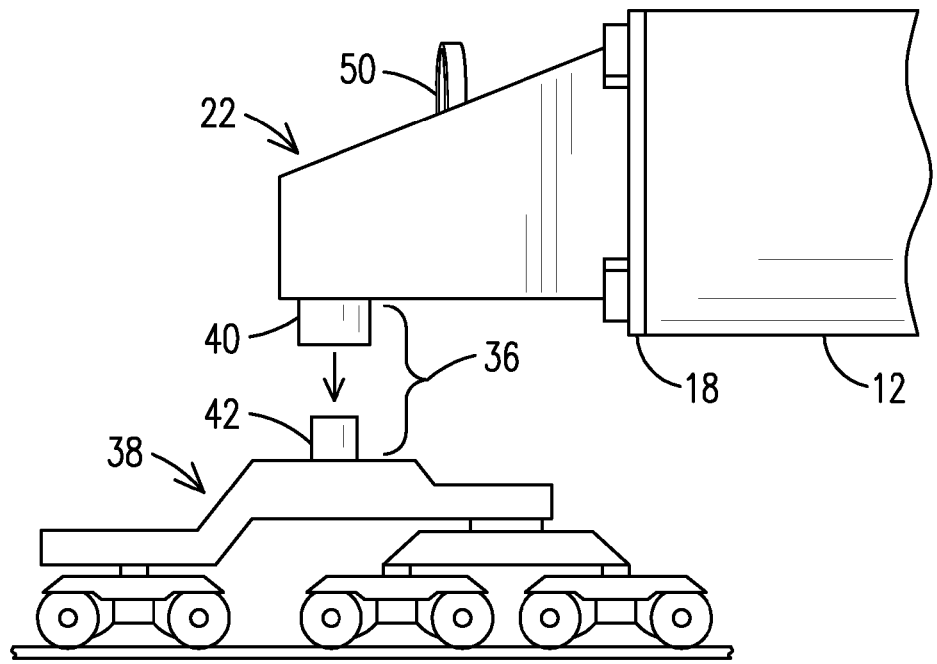
FIG. 10 is a side view of a portion of the transportation system, showing the universal adaptor receiver located on the supporting member.

FIGS. 9 and 10 illustrate some of the various uses for the receiver 40, in one example, for attachment to the mobile device 38 (in FIG. 9), and in another example, for attachment to the supporting member 22 (in FIG. 10). The pin/receiver assembly, 36 is also depicted in FIGS. 9 and 10.

FIGS. 11 and 12 provide a representation of the process by which the system 10 can be lifted using the lifting members 50, or by any other means of lifting the load 12, in one example for transferring the load from rail car to truck bed (or any first conveyance type to a second conveyance type). The receiver 40 functions to provide a connecting junction between the supporting member 22 and the mobile device 38, 39 in each case. Advantageously, no bolting or unbolting of a fastener or other structural member is required at any point on the transportation route from the first location to the final location of the load, even if a change of conveyance types is made, such as between a truck and a railcar. The system 10 further provides for a transfer from the truck bed back to the rail car with ease via a pick and place interface.

In the embodiment of FIG. 12, the male element 42 may optionally be made to be not rotatable within the receiver 40 in the truck configuration. Additionally, in the truck embodiment, the wheels on the rear mobile device 39 should be constructed such that the rear mobile device 39 does not fishtail as the truck navigates curves in the road. Alternatively, in the truck embodiments (such as FIG. 12), the rear male element 42 may lie on a standard trailer bed or the male element 42 may connect in between the tires on the back end (wherein no trailer is necessary in the back). Furthermore, in the truck embodiments, the load may extend beyond the bed and extend to the rear mobile device 39, and between the end of the bed and mobile device 39 there is nothing supporting the load. It is only supported at the end of the bed and at mobile device 39, but nowhere in between.

Figure 13:
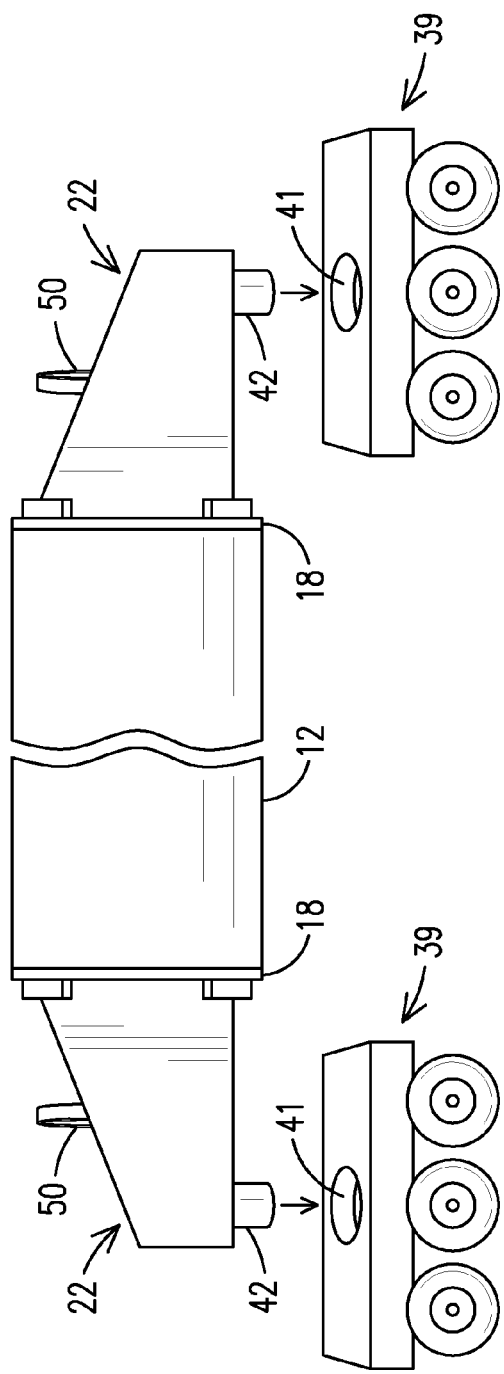
FIG. 13 is a side view of a load with two mobile devices on either side in an embodiment where the receiver comprises a hole in each mobile device.

In FIG. 13 a hole receiver 41 receives the male element 42. Here the hole receiver 41 is located in the center of the bed of the mobile device 39. The hole receiver 41 may be located in the bed of the mobile device 39 in a number of different configurations, however the mobile device 39 with one hole receiver 41 is presented here as an exemplary embodiment. This embodiment is an alternative embodiment to the cylindrically shaped receiver 40 found in other Figures of this application. This configuration including the hole receiver 41 allows the male element 42 to be inserted into the hole receiver 41 such that the male element 42 is either partially or fully inserted into the hole receiver 41.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A system for transporting a load via multiple conveyance types, the system comprising:
a supporting member comprising a first attachment structure configured for attachment to a top portion of a load and a second attachment structure configured for attachment to a bottom portion of the load, wherein the top and bottom portions of the load are separated by a horizontal center line of the load and the supporting member comprises a vehicle interface portion;
a first vehicle mounting device configured for attachment to a first vehicle of a first conveyance type and comprising a first supporting member interface portion;
a second vehicle mounting device configured for attachment to a second vehicle of a second conveyance type different than the first conveyance type and comprising a second supporting member interface portion;
the vehicle interface portion and the first and second supporting member interface portions are cooperatively configured such that, when the load is attached to the supporting member and the first vehicle mounting device is attached to the first vehicle and the second vehicle mounting device is attached to the second vehicle, the load can be moved between the first and second vehicles by a vertical lift and place move selectively parting and joining the vehicle interface portion with alternative ones of the first and second supporting member interface portions without the necessity of joining or separating a fastener.

2. The system of claim 1, wherein the supporting member comprises a lifting member by which the supporting member and the load can be lifted when the load is attached to the supporting member.

3. A system for transporting a load via multiple conveyance types, the system comprising:
a supporting member configured for attachment to a load and comprising a vehicle interface portion;
a first vehicle mounting device configured for attachment to a first vehicle of a first conveyance type and comprising a first supporting member interface portion;
a second vehicle mounting device configured for attachment to a second vehicle of a second conveyance type different than the first conveyance type and comprising a second supporting member interface portion;
the vehicle interface portion and the first and second supporting member interface portions are cooperatively configured such that, when the load is attached to the supporting member and the first vehicle mounting device is attached to the first vehicle and the second vehicle mounting device is attached to the second vehicle, the load can be moved between the first and second vehicles by a vertical lift and place move selectively parting and joining the vehicle interface portion with alternative ones of the first and second supporting member interface portions without the necessity of joining or separating a fastener;
wherein the supporting member comprises a first arm and a second arm joined to form a V-shaped supporting member.

4. The system of claim 3, wherein the first arm and the second arm each comprise a first attachment structure and a second attachment structure configured to attach to the load.

5. The system of claim 4, wherein the first attachment structure of each arm is configured for attachment to a top portion of the load and the second attachment structure of each arm is configured for attachment to a bottom portion of the load.

6. The system of claim 4, wherein the first attachment structure is attached to the load with a clamp and the second attachment structure is attached to the load with a bolt/nut combination.

7. The system of claim 1, further comprising a padding device intermediate member disposed between the load and the supporting member.

8. A system for transporting a load via multiple conveyance types, the system comprising:

a supporting member configured for attachment to a load and comprising a vehicle interface portion;

a first vehicle mounting device configured for attachment to a first vehicle of a first conveyance type and comprising a first supporting member interface portion;

a second vehicle mounting device configured for attachment to a second vehicle of a second conveyance type different than the first conveyance type and comprising a second supporting member interface portion;

the vehicle interface portion and the first and second supporting member interface portions are cooperatively configured such that, when the load is attached to the supporting member and the first vehicle mounting device is attached to the first vehicle and the second vehicle mounting device is attached to the second vehicle, the load can be moved between the first and second vehicles by a vertical lift and place move selectively parting and joining the vehicle interface portion with alternative ones of the first and second supporting member interface portions without the necessity of joining or separating a fastener;

wherein the height of the supporting member is vertically adjustable by placing at least one spacer between the vehicle interface portion and each of the respective ones of the supporting member interface portions such that a height of the supporting member relative to the respective vehicle can be adjusted according to a number of spacers disposed therebetween.

9. The system of claim 1, wherein the supporting member is configured for attachment to the load via a bolt/nut connection.

10. The system of claim 1, further comprising an intermediate member, wherein the supporting member is connected to the intermediate member, and the intermediate member is connected to the load.

11. The system of claim 1, wherein the vehicle mounting device of either of the first vehicle or the second vehicle is located approximately in the center of the respective vehicle.

12. The system of claim 1, wherein at least one of the vehicles is configured for attachment to two vehicle mounting devices.

13. The system of claim 1, wherein the first conveyance type is a roadway and the second conveyance type is a railway.

14. A system for transporting a load via multiple conveyance types, the system comprising:

a supporting member configured for attachment to the load and comprising a first mating element;

a second mating element configured for attachment to a first vehicle of a first conveyance type;

the first and second mating elements cooperatively configured when joined together to provide vertical support and horizontal rotational freedom between the load and the first vehicle;

a third mating element configured for attachment to a second vehicle of a second conveyance type different than the first conveyance type; and the first and third mating elements cooperatively configured when joined together to provide vertical support and horizontal rotational freedom between the load and the second vehicle;

wherein the supporting member is selectively joined to or separated from either of the second or third mating elements by a vertical lift and place movement of the load without the necessity of joining or separating a fastener.

15. The system of claim 14, wherein the supporting member comprises a lifting member by which the supporting member and the load can be lifted.

16. The system of claim 14, wherein the supporting member comprises a first arm and a second arm joined to form a V-shaped supporting member.

17. The system of claim 14, wherein the first mating element comprises a first element of a pin/receiver assembly and the second and third mating elements each comprise a second element of a pin/receiver assembly.

* * * * *